United States Patent [19]
Wilhelm et al.

[11] Patent Number: 5,978,498
[45] Date of Patent: Nov. 2, 1999

[54] APPARATUS FOR AUTOMATED IDENTIFICATION OF CELL GROUPINGS ON A BIOLOGICAL SPECIMEN

[75] Inventors: Paul S. Wilhelm, Kirkland; Shih-Jong J. Lee, Bellevue, both of Wash.

[73] Assignee: NeoPath, Inc., Redmond, Wash.

[21] Appl. No.: 08/927,379

[22] Filed: Sep. 12, 1997

Related U.S. Application Data

[63] Continuation of application No. 08/309,061, Sep. 20, 1994, abandoned.

[51] Int. Cl.$^6$ .............................. G06K 9/00; G06K 9/40
[52] U.S. Cl. ........................ 382/133; 382/128; 382/266
[58] Field of Search ................................. 382/128, 133, 382/134, 224, 266, 272, 257

[56] References Cited

U.S. PATENT DOCUMENTS

| | | | |
|---|---|---|---|
| 3,824,393 | 7/1974 | Brain | 250/222 |
| 4,097,845 | 6/1978 | Bacus | 340/146.3 |
| 4,122,518 | 10/1978 | Castleman et al. | 364/300 |
| 4,175,860 | 11/1979 | Bacus | 356/39 |
| 4,183,013 | 1/1980 | Agrawala et al. | 340/146.3 |
| 4,513,438 | 4/1985 | Graham et al. | 382/134 |
| 4,523,278 | 6/1985 | Reinhardt et al. | 364/413 |
| 4,538,299 | 8/1985 | DeForest | 382/197 |
| 4,709,333 | 11/1987 | Crawford | 364/414 |
| 4,725,543 | 2/1988 | Klevecz et al. | 382/133 |
| 4,731,860 | 3/1988 | Wahl | 382/281 |
| 4,965,725 | 10/1990 | Rutenberg | 382/133 |
| 4,973,111 | 11/1990 | Haacke et al. | 324/309 |
| 4,975,972 | 12/1990 | Bose et al. | 382/149 |
| 5,086,476 | 2/1992 | Bacus | 382/133 |
| 5,162,990 | 11/1992 | Odeyale et al. | 364/413.1 |
| 5,231,005 | 7/1993 | Russell et al. | 435/7.21 |
| 5,253,302 | 10/1993 | Massen | 382/110 |
| 5,257,182 | 10/1993 | Luck et al. | 364/413.1 |
| 5,268,967 | 12/1993 | Jang et al. | 382/132 |
| 5,281,517 | 1/1994 | Bacus et al. | 435/6 |
| 5,287,272 | 2/1994 | Rutenberg et al. | 364/413.01 |
| 5,315,700 | 5/1994 | Johnston et al. | 395/163 |
| 5,361,140 | 11/1994 | Hayenga et al. | 358/446 |
| 5,544,650 | 8/1996 | Boon et al. | 382/133 |

OTHER PUBLICATIONS

Bacus, James W. et al., "Optical Microscope System for Standardized Cell Measurements and Analyses", *Applied Optics*, 26:16, Aug. 15, 1987, pp. 3280–3293.

Bartels, Peter H. et al., "A Self–Learning Computer Program for Cell Recognition", *ACTA Cytologica: The Journal of Clinical Cytology*, 14:8, pp. 486–494, Oct. 1970.

Mackin, Robert W. et al., "Automated Three–Dimensional Image Analysis of Thick and Overlapped Clusters in Cytologic Preparations: Application to Cytologic Smears", *Analytical and Quantitative cytology and Histology*, 15:6, Dec. 1993, pp. 405–417.

(List continued on next page.)

*Primary Examiner*—Matthew C. Bella
*Attorney, Agent, or Firm*—Hans I. Sun; Emil Moffa

[57] ABSTRACT

The detection of cellular aggregates within cytologic samples. An image analysis system with an image gathering system includes a camera, a motion controller, an illumination system and an interface obtains images of cell groupings. The image gathering system is constructed for gathering image data of a specimen mounted on a slide and is coupled to a data processing system. Image data is transferred from the image gathering system to the data processing system. The data processing system obtains objects of interest. A four step process finds cellular aggregates. The first step is acquisition of an image for analysis. The second step is extraction of image features. The third step is classification of the image to determine if any potential cellular aggregates may exist in the image. The fourth step is segmentation of objects which includes the substeps of detecting and locating potential cellular aggregates.

22 Claims, 14 Drawing Sheets

OTHER PUBLICATIONS

Tanaka, Noboru et al., "Automated Cytologic Screening System (CYBEST Model 4): an Integrated Image Cytometry System", *Applied Optics,* vol. 26, No. 16, pp. 3301–3307, Aug. 15, 1987. Copyright © 1987 by the Optical Society of America.

Brakenhoff, G.J. et al., "Three–Dimensional Chromatin Distribution in Neuroblastoma Nuclei Shown by Confocal Scanning Laser Microscopy", *Letters To Nature,* vol. 317, pp. 748–749, Oct. 24, 1985.

Van Der Linden, J.A.M. et al., "Simple Three–Dimensional Imaging of HRP–Labelled Neurons With the Aid of an Image Processor", *Journal of Microscopy,* vol. 153, Pt. 2, pp. 223–229, Feb. 1989.

Duda, Richard O. and Peter E. Hart, "Fisher's Linear Discriminant", *Patent Classification and Scene Analysis,* Copyright ©1973, pp. 114–119.

Weber, J.E. et al., "Fuzzy Reasoning, Possibility Theory and Probability Theory in Expert Systems for Histopathology", IEEE/Ninth Annual Conference of the Engineering in Medicine and Biology Society, pp. 1560–1562, ©1987.

Wied, G.L. et al., "Expert Systems as Classifiers in Diagnostic Cytopathology", IEEE/Ninth Annual Conference of the Engineering in Medicine and Biology Society, pp. 1915–1917, ©1987.

Wied, G.L. et al., "Expert System Design Under Uncertainty of Human Diagnosticians", IEEE/Eighth Annual Conference of the Engineering in Medicine and Biology Society, pp. 757–760, ©1986.

Wied, G.L. et al., "Ticas–Stratex, an Expert Diagnostic System For Stratified Cervical Epithelium", IEEE/Ninth Annual Conference of the Engineering in Medicine and Biology Society, pp. 1557–1559, ©1987.

Serra, J., *Image Analysis and Mathematical Morphology,* pp. 372–423, Academic Press, 1982.

Smith, Warren J., "Image Evaluation", *Modern Optical Engineering,* McGraw–Hill Book Company, 1966, pp. 308–325.

Patten, Jr., Stanley, "Diagnostic Cytopathology of the Uterine Cervix", Basel, Switzerland, Publisher: S. Karger, 1969, 2nd Edition 1978, Third volume in *Monographs in Clinical Cytology,* edited by G.L. Wied, pp. 10–15.

Kurman, Robert J. et al., "Part 1: Specimen Adequacy" and "Part 2: Descriptive Diagnoses", The Bethesda System for Reporting Cervical/Vaginal Cytologic Diagnoses, Springer–Verlag.

Dytch, Harvey E. et al., "An Interactive Microcomputer–Based System for the Quantitative Analysis of Stratified Tissue Sections", *Analytical and Quantitative Cytology and Histology,* vol. 9, No. 1, pp. 69–78, Mar. 1987.

Enslein, Kurt and Peter W. Neurath, "Augmented Stepwise Discriminant Analysis Applied to Two Classification Problems in the Biomedical Field", *Computers and Biomedical Research,* 2, 568–581 (1969).

Elmoataz, A. et al., "Segmentation and Classification of Various Types of Cells in Cytological Images", IEEE, Apr. 7, 1992.

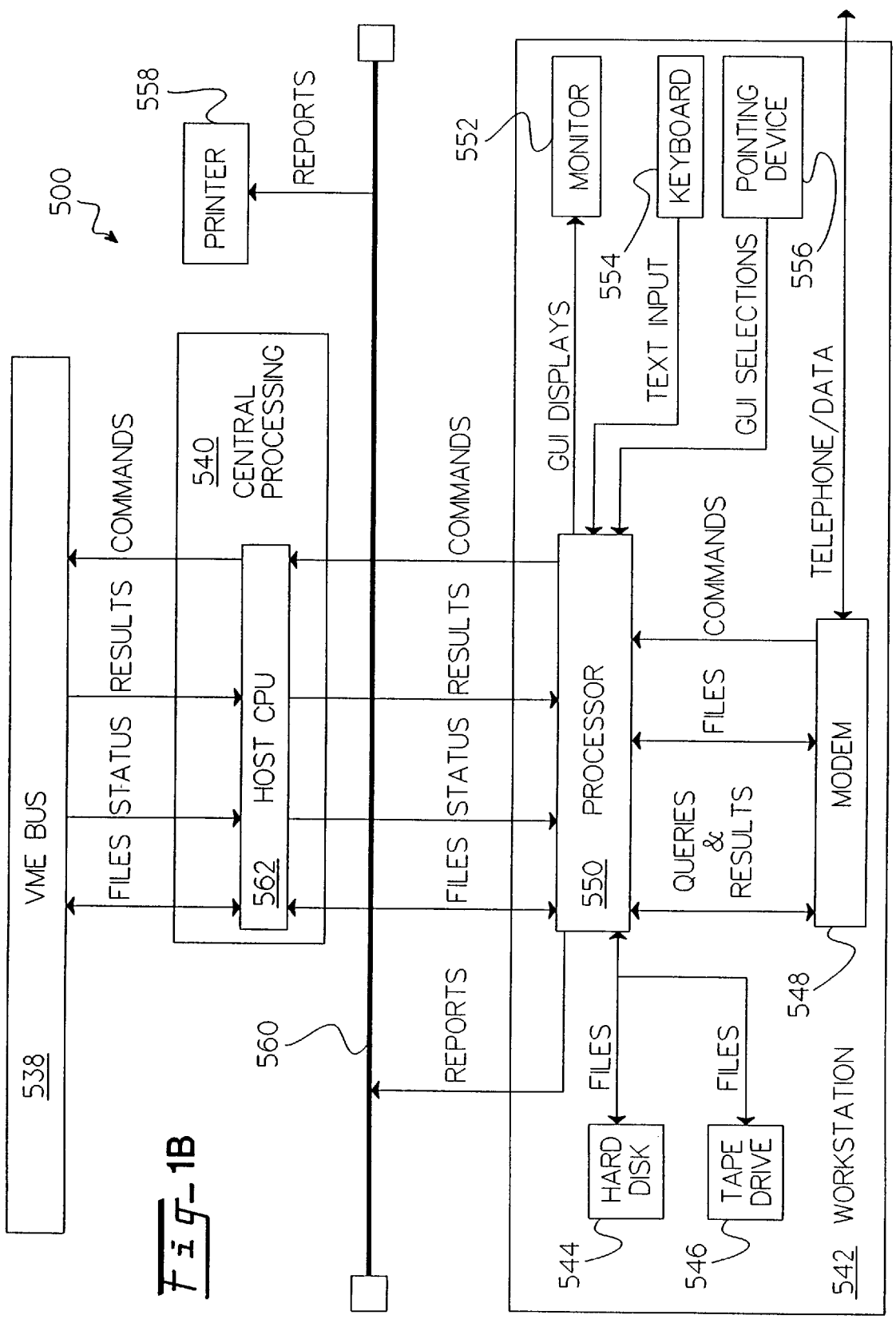

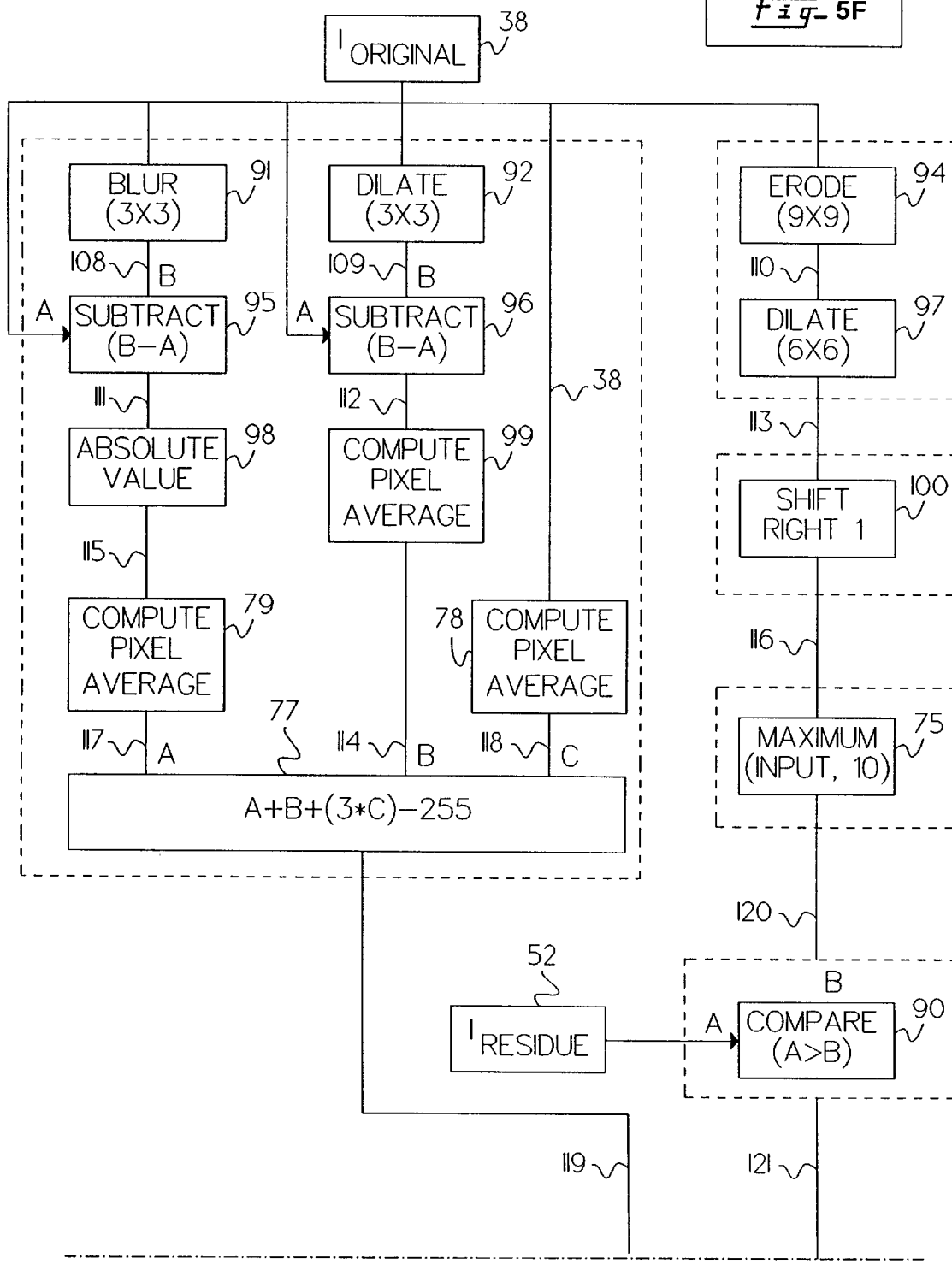

APPARATUS FOR AUTOMATED IDENTIFICATION OF CELL GROUPINGS ON A BIOLOGICAL SPECIMEN

This application is a continuation of application Ser. No. 08/309,061, filed on Sep. 20, 1994, now abandoned.

This invention relates to the automated detection of aggregates of cells within biologic samples such as cytologic specimens and more particularly to an automated cytology system that classifies cytological specimens, based in part on the analysis of aggregates of cells, as normal or needing human review.

BACKGROUND OF THE INVENTION

Historically, screening of cytologic material has been a task for trained technicians and cyto-pathologists. Even though screening is done by highly trained individuals, the task is repetitive and requires acute attention at all times. Since screening of cytologic material is repetitive and tedious, it has been thought to be ripe for automation. On the other hand, the complexity and variety of material found in cytologic specimens has proven very difficult to examine in an automated fashion. As a result, automated screening of cytologic specimens has been the unrealized goal of research for many years.

Recent research has demonstrated an effective approach for detection and identification of cellular abnormalities as demonstrated by isolated cells in a cytologic sample (U.S. patent application Ser. No. 08/179,812, Method for Identifying Objects Using Data Processing Techniques). However, in many cases, significant abnormalities are manifested within cell aggregates rather than as isolated cells. See "Diagnostic Cytopathology of the Uterine Cervix", by Stanley F. Patten, Jr. Identification of cell groupings in biological specimens has previously been achieved by human visual identification. It is important, therefore, that any automated screening device have the capability of identifying abnormalities within cell aggregates as well as among isolated cells. Additionally, in cervical cytology, sample adequacy as defined in The Bethesda System "The Bethesda System for Reporting Cervical/Vaginal Cytologic Diagnoses", Robert J. Karman, Diane Soloman, Springer-Verlag, 1994 is determined, in part, through the identification of endocervical component cells in the sample that appear almost exclusively within aggregates. Therefore, the design of an automated screening device for cytologic samples must include the ability to detect and identify cellular aggregates.

Therefore it is a motivation of the invention to automatically identify cell groupings within cellular specimens.

SUMMARY OF THE INVENTION

The invention provides a method and apparatus for the detection of cellular aggregates within cytologic samples. The invention comprises an image analysis system that further comprises an image gathering system having a camera, a motion controller, an illumination system, and an image transfer interface. The image gathering system is constructed for gathering image data of a specimen mounted on a slide. The image gathering system is coupled to a data processing system to transfer image data from the image gathering system to the data processing system. The data processing system analyzes the image data to identify objects of interest. The data processing system implements a four step process. The first step is the acquisition of an image for analysis. The second step is the extraction of image features. The third step is classification of the image to determine if any potential cellular aggregates may exist in the image. The fourth step is segmentation of objects which include the substeps of detecting and locating potential cellular aggregates.

It is one object of the invention to automate a process that is currently manual, and labor intensive.

It is another object of the invention to improve the accuracy and consistency of examination, while lowering the overall cost of specimen examination.

It is another object of the invention to provide a means for standardizing the examination.

It is yet a further object of the invention to provide detection of endocervical components, endometrial cells, and adenocarcinoma cells on a slide.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 1A, 1B and 1C show an apparatus for automatic identification of cell groupings on a biomedical specimen.

DETAILED DESCRIPTION OF THE PREFERRED EMBODIMENT

Figure 1A:
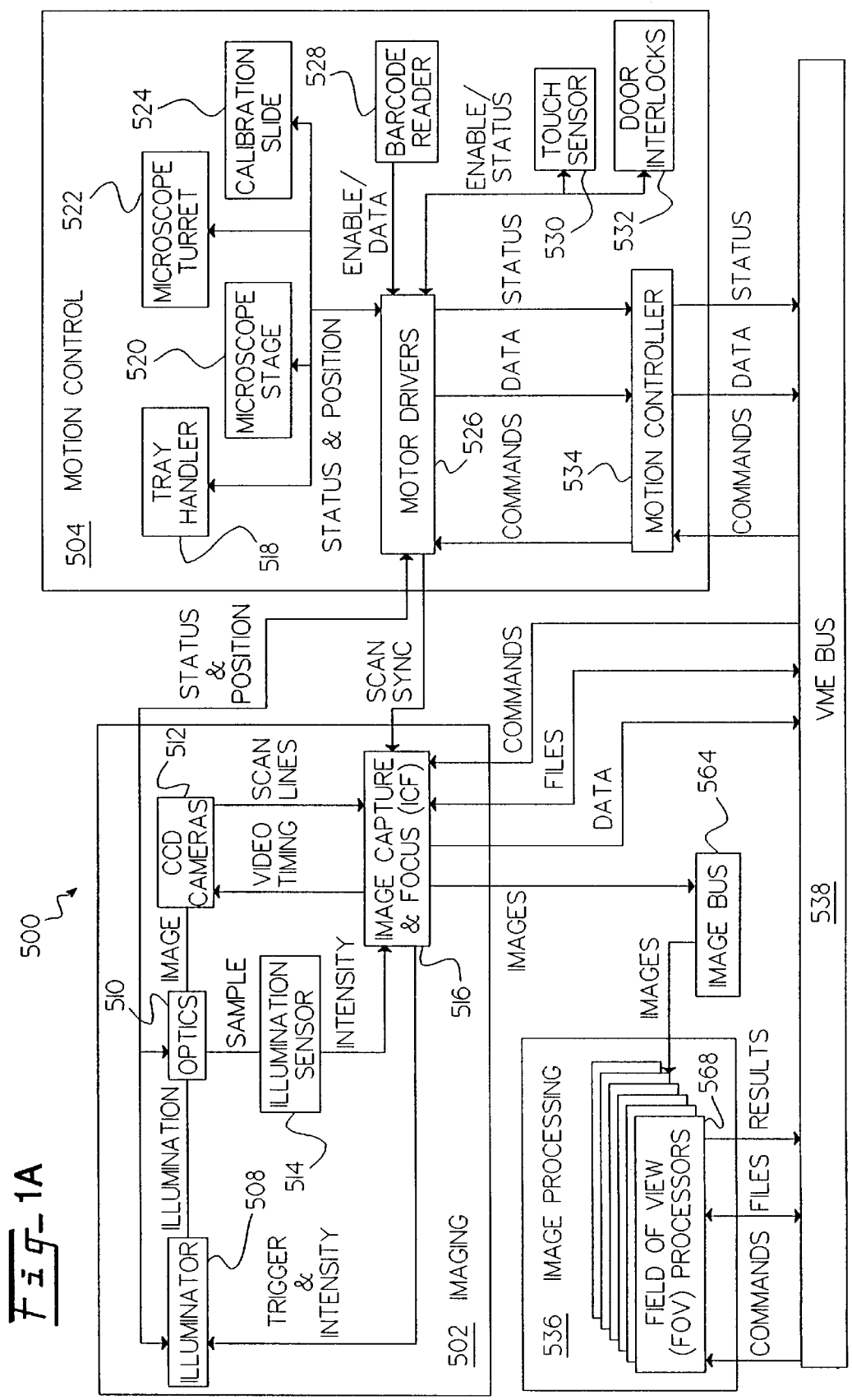

In a presently preferred embodiment of the invention, the camera system disclosed herein is used in a system for analyzing cervical pap smears, such as that shown and Now refer to FIGS. 1A and 1B which show a schematic diagram of one embodiment of the apparatus of the invention for checking illumination integrity for an automated microscope. While the method and apparatus of the invention will be discussed in terms of an example herein related to an automated cytology apparatus, it will be understood that the invention is not so limited. The features and principles of the invention may be applied to check urine analysis processes, semiconductor process defects, liquid crystal devices and other types of processing systems employing, for example, continuous arc lamps, filament lamps, laser sources, tube cameras, PIN diodes and photomultiplier tubes.

The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope. The illuminator 508 provides illumination of a slide. The image capture and focus system 516 provides data to a VME bus 538. The VME bus 538 distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a Motorola 68030 CPU. The motion controller 504 is comprised of a tray handler 518, a microscope stage controller 520, a microscope turret controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet (TM) communication system 560 communicates to a workstation 542 to provide control of the system. A hard disk 544 is controlled by workstation processor 550. In one embodiment, workstation 542 may comprise a Sun Sparc Classic (TM) workstation. A tape drive 546 is connected to the workstation processor 550 as well as a modem 548, a monitor 552, a keyboard 554, and a mouse pointing device 556. A printer 558 is connected to the Ethernet (TM) network system 560.

During image collection integrity checking, the central computer 540, running a real time operating system, controls the automated microscope and the processor to acquire and digitize images from the microscope. The flatness of the slide may be checked, for example, by contacting the four corners of the slide using a computer controlled touch sensor. The computer 540 also controls the microscope stage to position the specimen under the microscope objective, and from one to 15 field of view (FOV) processors 568 which receive images under control of the computer 540.

Figure 1C:
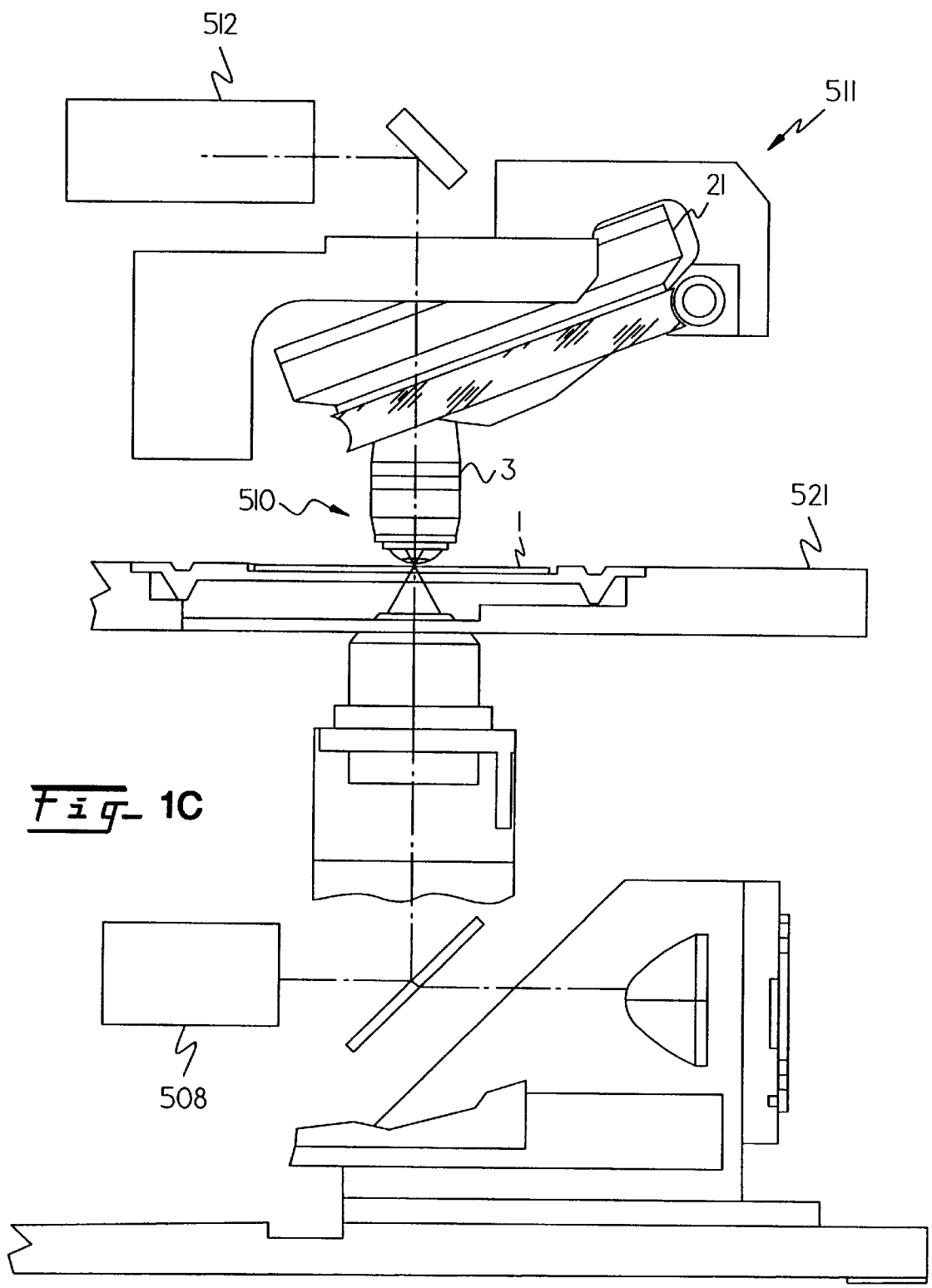

Referring now to FIG. 1C, there shown is placement of a calibration and test target 1 into an optical path of an automated microscope 3 having a turret 21. The calibration and test target may be mounted on a stage 521 substantially in a horizontal X,Y plane which intersects the optical path. The stage 521 is movable in the X,Y plane as well as along a Z axis which is perpendicular to the X,Y plane and which is parallel to the optical axis of the automated microscope. The turret 21 may comprise multiple objective lenses as is well known in the art. The microscope turret control 522 provides signals in a well known manner for positioning a selected objective lens into position for viewing a slide, for example.

It is to be understood that the various processes described herein may be implemented in software suitable for running on a digital processor. The software may be embedded, for example, in the central processor 540.

Figure 2A:
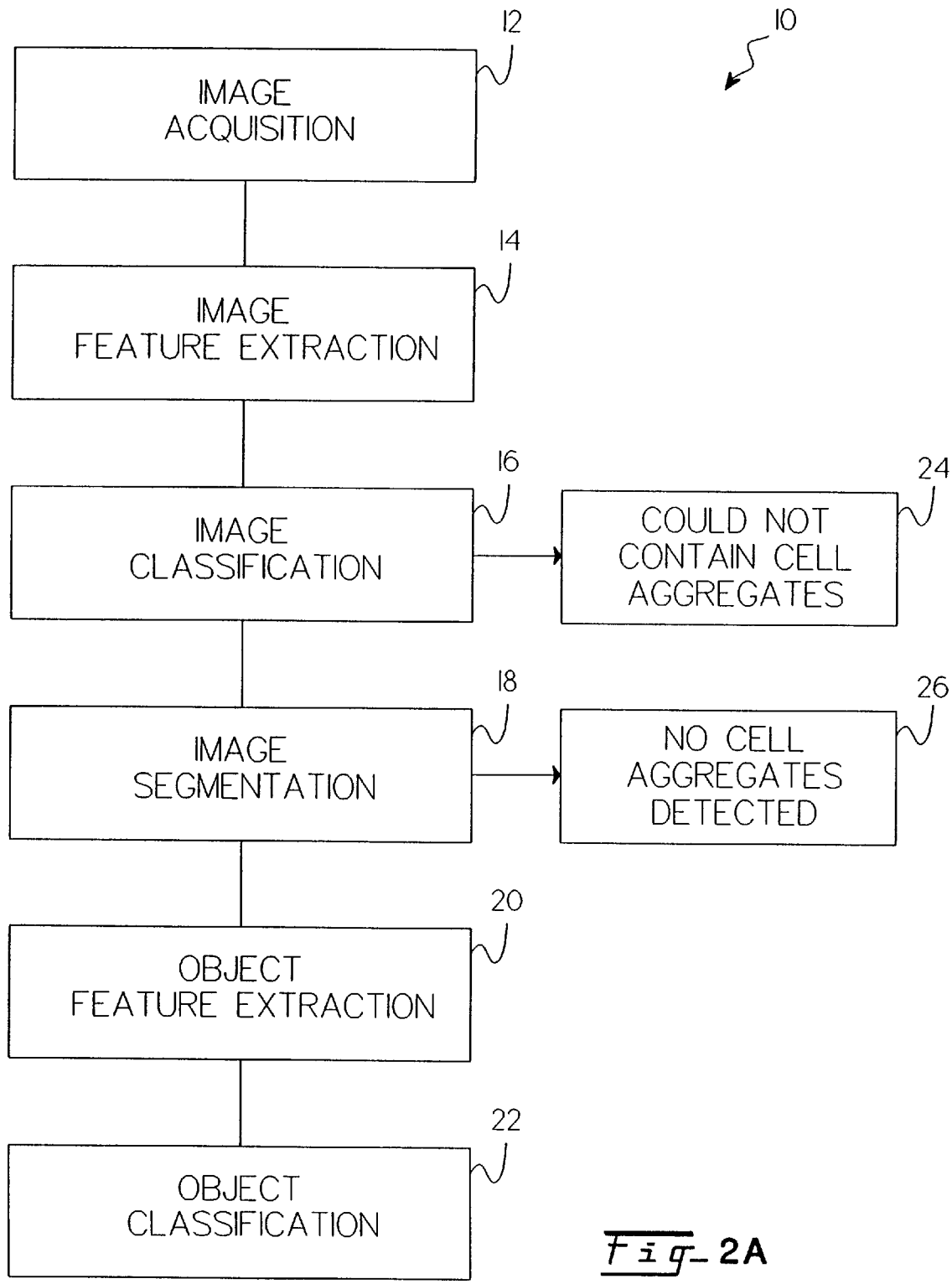
FIG. 2A shows a process flow diagram of the image processing and analysis performed for each image of biologic specimens.

Refer now to FIG. 2A which shows a process flow diagram of the method of the invention to analyze cell aggregates. An image is acquired in step 12. In a preferred embodiment of the invention, the image is acquired using a digital camera attached to a microscope as shown in FIGS. 1A, 1B and 1C. The image acquired by the camera is of the cytologic specimen, magnified by an objective lens of 20× magnification. The camera digitizes the image to 512 by 512 pixels to a depth of 8 bits. The magnification of 20× and an image size of 512 by 512 pixels is by way of example and not limitation, and one skilled in the art will appreciate that other magnifications and image sizes may be used without departing from the scope of the invention.

Since cellular aggregates may not exist in every acquired image, and since it is important to process images rapidly, the invention avoids extensive processing of images that contain no material of interest. Image feature extraction 14 and image classification 16 show the process to achieve rapid removal of unproductive images in step 24. Features and properties of the image are measured in image feature extraction in step 14. The measured features are then used to determine if the image may contain identifiable cellular aggregates. In one preferred embodiment, if a characteristic called AverageHighPixelValue is greater than 240, then the image is rejected. AverageHighPixelValue may be defined as the average intensity value of all pixels with pixel counts above 200 in an image where 0 is black and 255 is white. The AverageHighPixelValue rule will identify images with very little cellular material. Such images have little chance of representing a cellular aggregate. If no cell aggregates are detected, the image is rejected in step 26.

Additionally, if:

(SmallDarkEdgeAverage*35000)+HighPixelCount<15000, then the image is rejected, where SmallDarkEdgeAverage may be defined as the average value of image subject to a 5×5 closing residue operation, $$SmallDarkEdgeAverage = \frac{1}{N_{Pixels}} \sum_{All_{Pixels}} (((I_{orig} \oplus (5 \times 5)) \ominus (5 \times 5)) - I_{orig})$$

where $N_{Pixels}$ is the number of pixels in the image, $All_{Pixels}$ indicates that the summation covers all pixels in the image, $I_{Orig}$ is the original image, $\oplus$ is the morphological dilation operator (for example, as disclosed in Serra, J., "Image Analysis and Mathematical Morphology", Academic Press, 1982), $\theta$ is the morphological erosion operator, closing residue is represented by the operation enclosed in parenthesis above, and HighPixelCount is the number of pixels with pixel counts above 200 in the original image. The expression "(5×5)" specifies the kernel size for the morphological operation. The SmallDarkEdgeAverage rule will identify images with so much material that reliable detection and identification of cellular aggregates is unlikely.

Figure 2B:
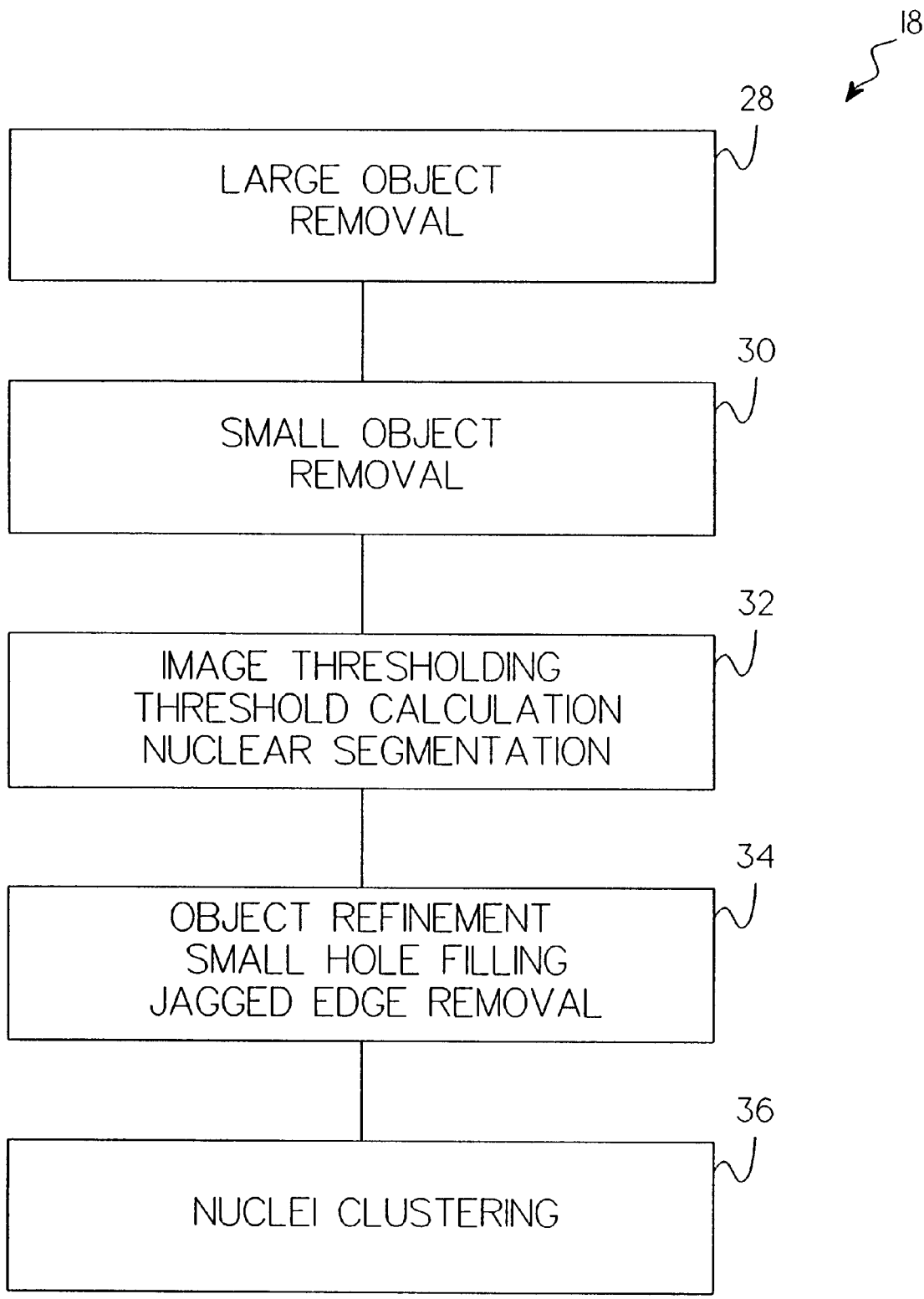
FIG. 2B shows a process flow diagram of the method of the invention to segment each image of biologic specimens.

Refer now to FIG. 2B which shows the image segmentation method of the invention. The image segmentation step 18, performs the identification of potential cellular aggregates. It is based on first identifying potential cell nuclei and then determining which nuclei lie close enough to other nuclei to be considered part of a cellular aggregate. In one preferred embodiment, the image segmentation step includes five sub-steps. Segmentation steps 28 and 30 remove background objects, segmentation step 32 is image thresholding, segmentation step 34 is object refinement, and segmentation step 36 is nuclei clustering.

Figure 3:
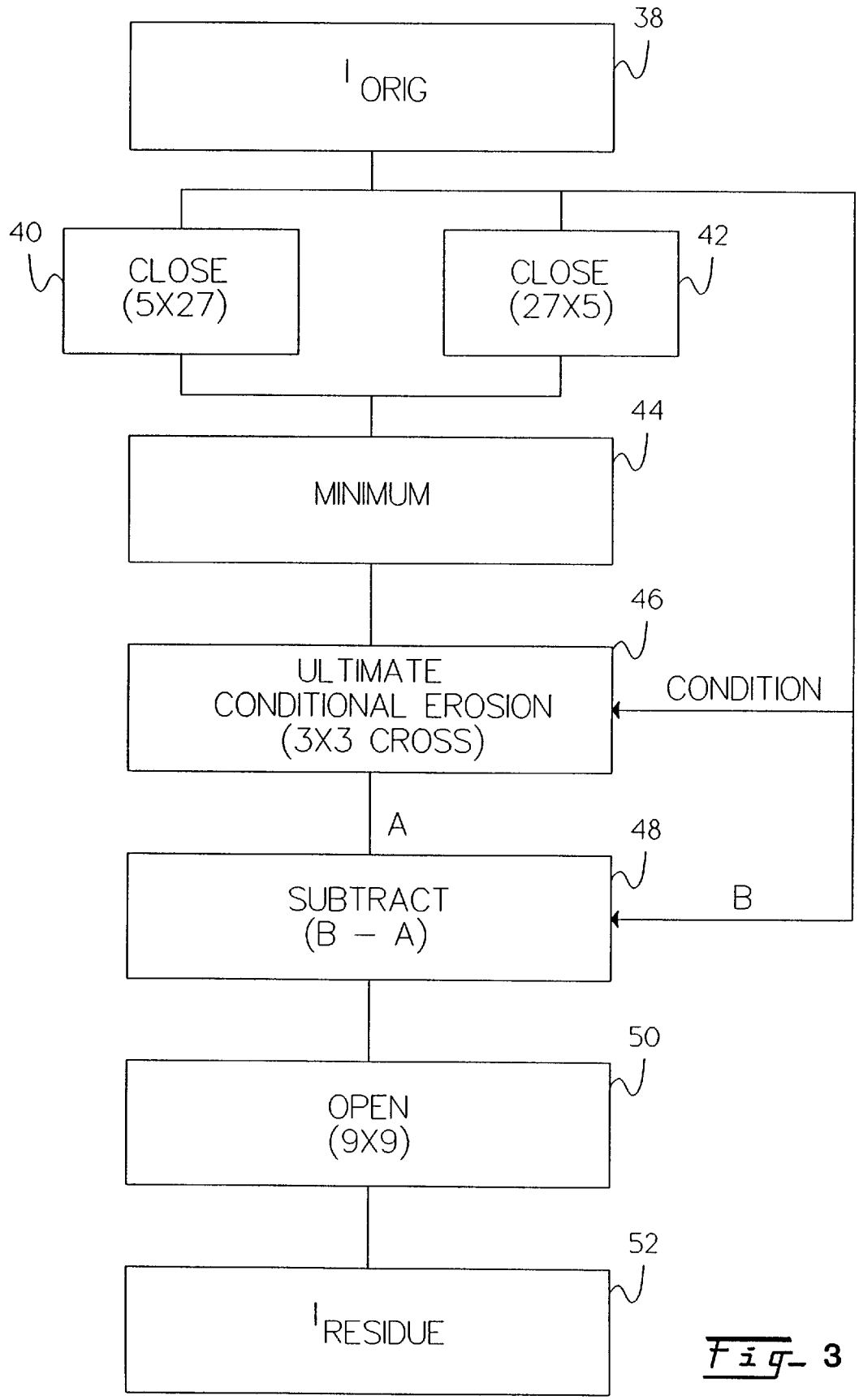
FIG. 3 shows a process flow diagram for background object removal.
Figure 4A:
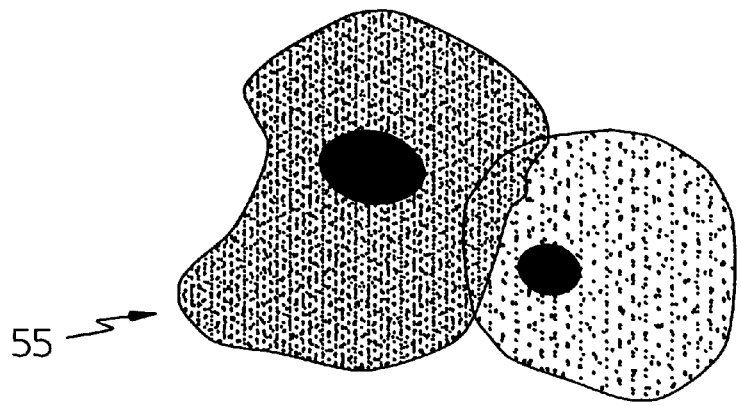
FIGS. 4A, 4B, 4C and 4D show a schematic of a combination of two segmentation masks.
Figure 4B:
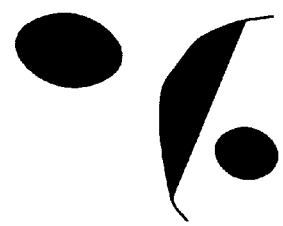
Figure 4C:
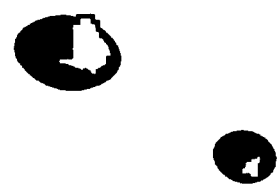
Figure 4D:
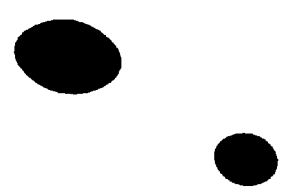

Refer now to FIG. 3 which shows the method of the invention to remove large objects from the image. Since nuclei have a finite size range, it is useful to remove objects larger and smaller than that range before image thresholding step 32. In one preferred embodiment, large objects are removed by closing the image 38 with a 27 by 5 flat top structuring element 42 and with a 5 by 27 flat top structuring element 40.

$$I_{Closed}=\min[((I_{orig}\oplus(27\times5))\ominus(27\times5)), (((I_{orig}\oplus(5\times27))\ominus(5\times27)))]$$

The closed image 44 is then iteratively eroded conditioned on the original image until no more erosion takes place. This is termed ultimate conditional erosion 46. The structuring element for the ultimate conditional erosion is a flat top cross of 3×3 pixels.

$I_{Erode(0)}I_{Closed}$
$I_{Erode(1)}=\max [I_{Orig}(I_{Erode(0)}\ominus((3\times3)_{Cross}))]$
i=1
While $(I_{Erode(i)} \neq I_{Erode(i-1)})$
{
$I_{Erode(i+1)}=\max [I_{Orig}(I_{Erode(i)}\ominus((3\times3)_{Cross}))]$
i++
$I_{Erode}=I_{Erode(i)}$
}

In the above equations, a 3×3 cross structuring element is a center pixel, two adjacent horizontal pixels, and two adjacent vertical pixels, and where $I_{Erode(i)}$ represents the $i^{th}$ iteration of conditional erosion equation in the while loop above, of the image. The residue 48 of the conditionally closed, eroded image and the original image contain only objects that are small enough to be nuclei, large objects are removed. The residue image is then opened with a 9 by 9 flat top structuring element 50 to remove objects smaller than valid nuclei thereby producing a residue image 52.

To define potential nuclear regions of the image, the gray scale image is thresholded to produce a binary mask in step 32. In a binary mask, pixels may take on one of two values, active or inactive. Active pixels represent regions where potential nuclei have been identified. In one preferred embodiment, thresholding is done by combining results of two different methods, thereby incorporating the advantages of one to offset the disadvantages of the other. The first method segments the majority of nuclei completely with little problem of over segmentation. In one preferred embodiment, the nuclei identified by the first method is used when the second method confirms that the mask of the first is not a false segmentation shown schematically in FIGS. 4A, 4B, 4C and 4D.

Now refer to FIGS. 4A, 4B, 4C and 4D, which show a graphical example of combination of two segmentation masks to take advantage of the strengths of each. In this preferred embodiment, the first segmentation mask is created by blurring, scaling, and clipping the original image 55 for use as a threshold image for the image that resulted from step 28 above. Blurring removes information other than background from the threshold image. Scaling provides appropriate threshold levels. Clipping assures that nuclei have at least a minimum residue strength before they are included in the mask. In a preferred embodiment, the functions are implemented as:

$I_{Blur}=((I_{orig})\ominus(9\times9))\oplus(6\times6)$,
$I_{Scale}=I_{Blur}/2$,
$I_{Clip}=\max(I_{Scale},10)$,
then the first mask is generated by the following rule: For each Pixel i

{

If($I_{iResidue}>I_{iClip}$)then $I_{iFirstMask}$1 else $I_{iFirstmask}=0$

}

Where $I_{iResidue}$ is the $i^{th}$ pixel of image $I_{Residue}$ and $I_{iClip}$ is the $i^{th}$ pixel of image $I_{Clip}$. In this preferred embodiment, the second mask is created by conditioning the residue image $I_{Residue}$.

Often nuclei appear overlapped in an image. If a threshold is calculated for all nuclei without regarding overlap, nuclei that overlap will be segmented as one. If the threshold for overlapping objects is adjusted to segment less, the nuclei may segment as separate objects. When objects overlap, their apparent darkness is greater; their residue will be stronger. Therefore, in one preferred embodiment, objects with strong residue are thresholded differently than those with weak residue.

A modified residue image, $I_{ResidueMax}$, containing only monotonically valued objects is created by conditionally dilating the residue image only in areas where pixels are greater than zero so that each object has all pixels equal to the value of the maximum pixel value for the object in the residue image.

$I_{ResidueMax(0)}=I_{Residue}$
i=1
while(i≦8)
{
$I_{Temp}=(I_{ResidueMax(i-1)}\oplus((3\times3)_{Cross}))$
For each Pixel j

{

If($I_{jResidue}>0$)then $I_{jResidueMax(i)}=I_{jTemp}$ else $I_{jResidueMax(i)}=0$

} i++

}

An object is considered to have a strong residue if its maximum residue value is greater than StrongobjectTestValue where StrongObjectTestValue=(ImageBrightness*3)+ImageEdgeStrength−225

$$ImageBrightness = \frac{1}{N_{Pixels}}\left(\sum_{Pixels} PixelValue_i\right)$$

$$ImageEdgeStrength = \frac{1}{2N_{Pixels}}\left(\sum_{Pixels}((I_{Orig}\oplus(3\times3))-I_{Orig})+\sum_{Pixels}abs((I_{Orig}\vartheta(3\times3))-I_{Orig}))\right)$$

Where v represents a binomial filter (in the case of a 3×3, it is a convolution operation, for which the kernel weights would be 1/16, 2/16, 1/16 for the top row, 2/16, 4/16, 2/16 for the middle row, and 1/16, 2/16, 1/16 for the bottom row). An image, $I_{StrongObjects}$, is produced by retaining only the strong objects. For each Pixel i
{
If($I_{iResidueMax}>$StrongObjectTestValue)
then $I_{iStrongObjects}=I_{iResidue}$
else $I_{iStrongObjects}=0$
}

An edge image is created.

$$I_{Edge}=((((I_{Residue})\oplus(3\times3))-I_{Residue})-((I_{Residue})\ominus(3\times3)))*2$$

From the edge image, the residue image, and the strong object image a threshold is computed.

$$I_{Thresh}=I_{Edge}+\frac{1}{2}(I_{Residue})+\frac{3}{8}(I_{StrongObjects})$$

The mask for the second method is:
For each Pixel i
{
  If($I_{iResidue}>I_{iThresh}$)
  then $I_{iSecondMask}=1$
  else $I_{iSecondMask}=0$
}
The nuclei mask is the conditional dilation of the second mask conditioned on the first mask (the conditional dilation is repeated 4 times to allow the complete dilation of all nuclei).
i=1
while (i≦4)
{
  $I_{Nuclei}=\min[I_{FirstMask},(I_{SecondMask}\oplus((3\times3)_{Cross}))]$
  $I_{SecondMask}=I_{Nuclei}$
  i++
}

Figure 5A:
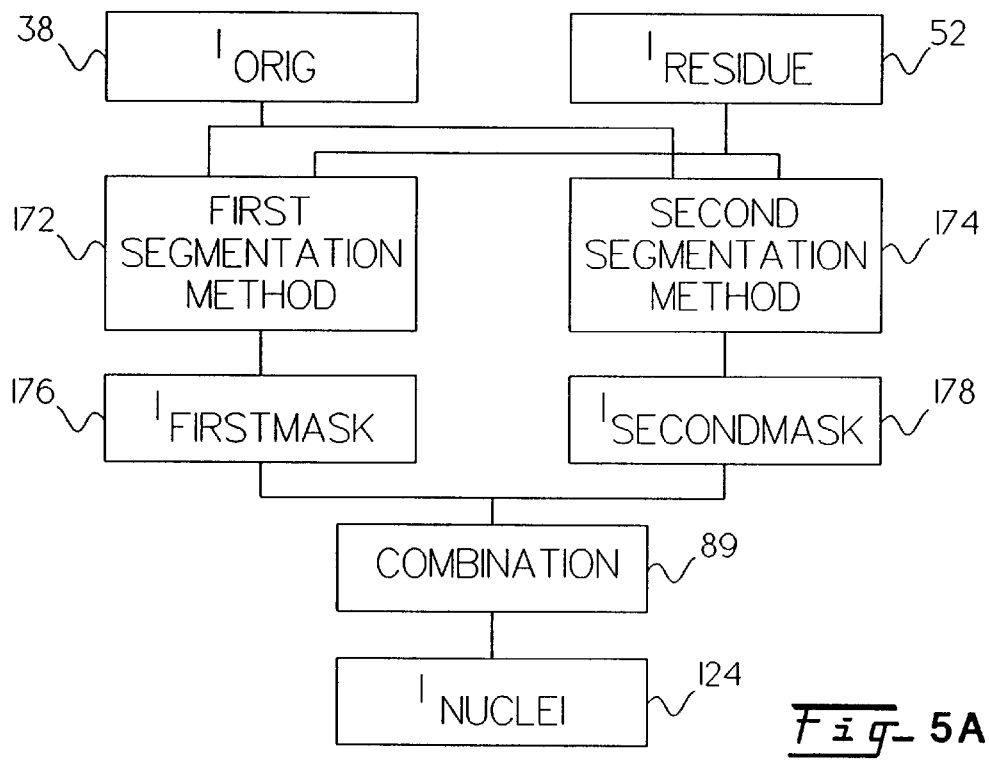
FIGS. 5A, 5B, 5C and 5D show process flow diagrams for the nuclear thresholding of the invention, wherein FIG. 5D comprises FIG. 5E and FIG. 5F which are intended to be read pieced together at a single Figure.

Now refer to FIG. 5A which shows one embodiment of nuclear thresholding as employed in the method of the invention. An original image 38 and a residue image 52 are fed to a first segmenter 172 and a second segmenter 174. The first segmenter 172 generates a first mask 176. The second segmenter 174 generates a second mask 178. The combination of the first mask 176 and the second mask 178 in combiner 89 produces a nuclei image 124.

Figure 5B:
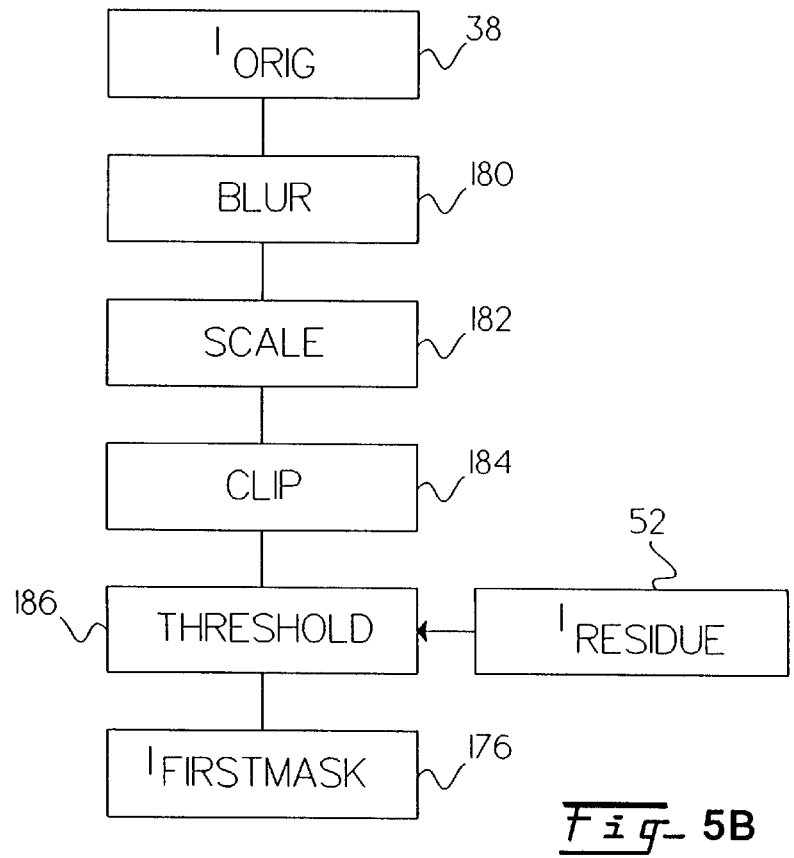

Now refer to FIG. 5B which shows the first segmenter of the invention. The original image 38 is fed to be blurred in 180. The image is then scaled in 182. The image is then clipped in 184. The residue image 52 is then thresholded with the clipped image in 186 to generate a first mask 176.

Figure 5C:
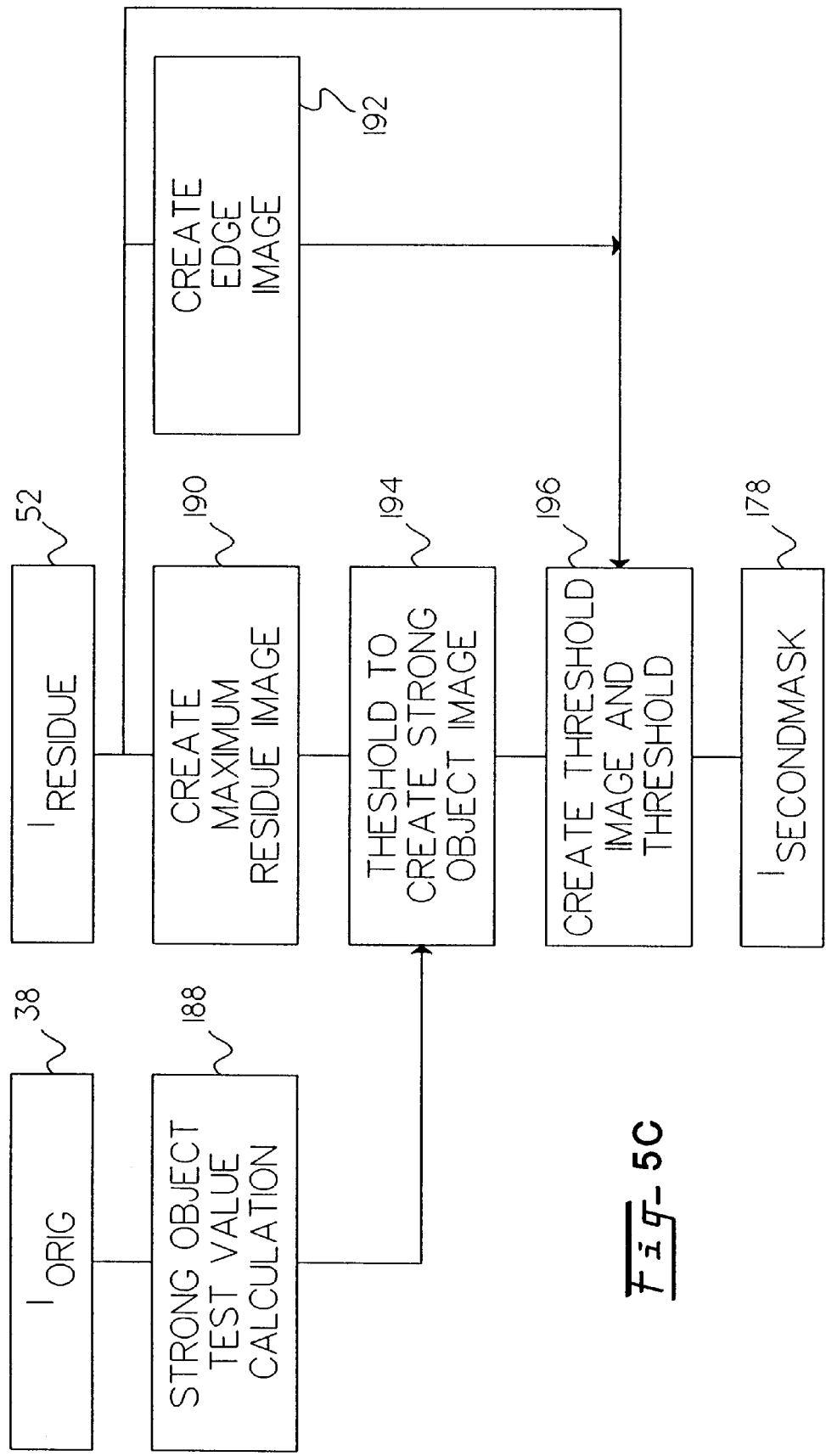

Now refer to FIG. 5C which shows the creation of the second mask 178. The original image 38 is fed to test the strong object value calculator 188. The residue image is fed to create a maximum residue image 190 and an edge image 192. A strong object image is created by thresholding 194. The second mask 178 is created by taking the residue image 52, and thresholding with the threshold images 196, generated from the strong object image 194 and the edge image 192.

Figure 5F:
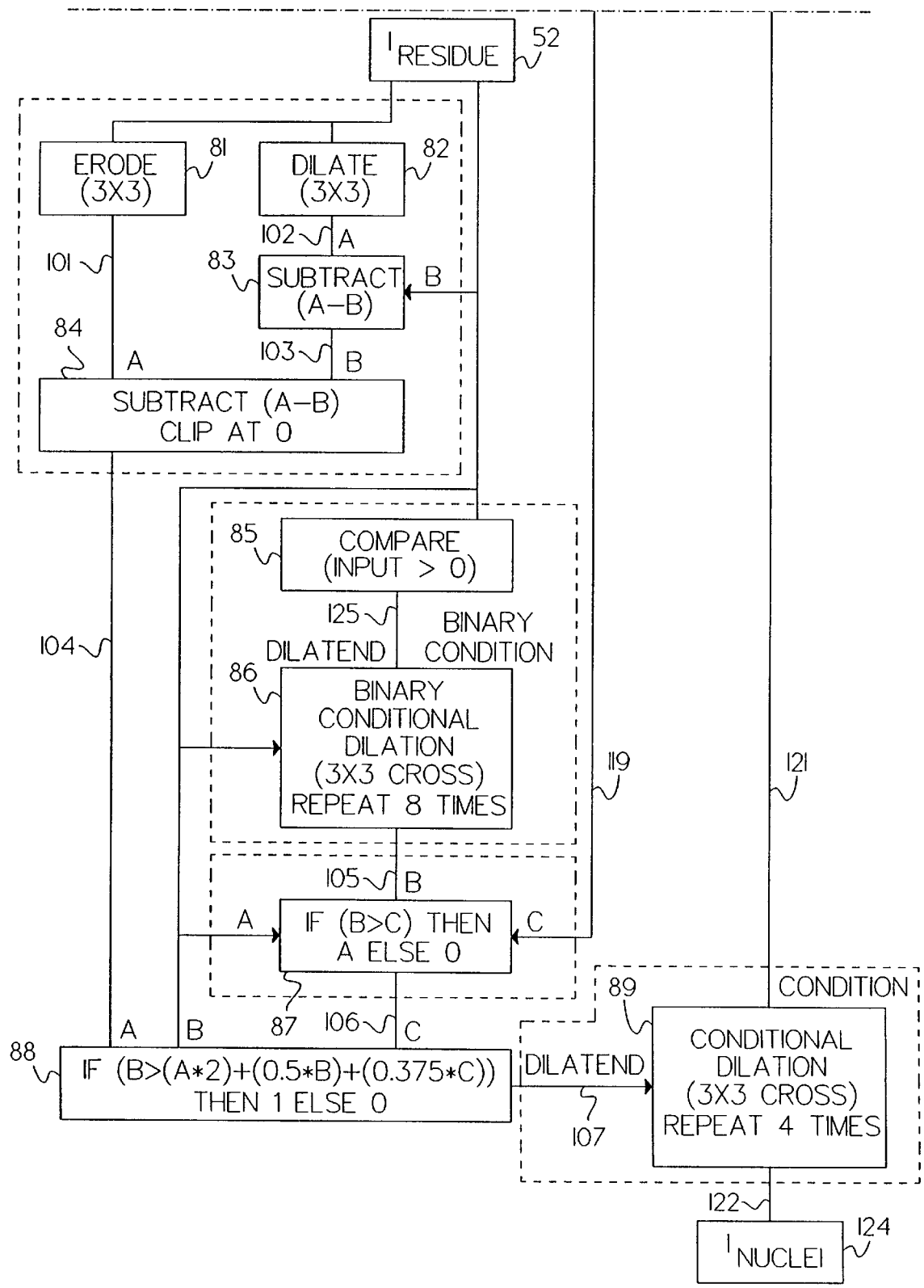

Now refer to FIG. 5D, comprising FIG. 5E and FIG. 5F, which shows the processing flow for a preferred embodiment of nuclear thresholding to find a nuclei image from an original image, where a residue image has already been created from the original image. The cytological image processing method starts with the step of obtaining a digital representation of the cytological image 38. The invention then does a 3×3 erode 81 of the residue image 52 to provide a first representation 101. A 3×3 dilation 82 of the residue image 52 provides a second representation 102. Subtracting 83 the residue image 52 from the second representation 102 provides a third representation 103. Subtracting 84 the third representation 103 from the first representation 101 and setting all negative values to zero provides a fourth representation 104. The invention then compares 85 the residue image 52 to zero to provide a binary condition control signal 125. The invention then repeats a binary conditional dilation 86 with a 3×3 cross, eight times to provide a fifth representation 105. The residue image 52 is transferred to a sixth representation 106 if the fifth representation 105 is greater than a nineteenth representation 119 at step 87. The invention then morphologically computes 88 a binary result to a seventh representation 107, the binary result being one if the residue image 52 is greater than a predetermined combination of the fourth representation 104, the residue image 52 and the sixth representation 106, zero otherwise. In one embodiment, if the residue image 52 is greater than two times the fourth representation 104 plus 0.5 times the residue image 52 plus 0.375 times the sixth representation 106, then the seventh representation 107 is set to a one, zero otherwise. A 3×3 blurring 91 of the original image 38 provides an eighth representation 108. A 3×3 dilation 92 of the original image 38 provides a ninth representation 109. A 9×9 erosion 94 of the original image 38 provides a tenth representation 110. The invention then subtracts 95 the original image 38 from the eighth representation 108 to provide an eleventh representation 111. Subtraction 96 of the original image 38 from the ninth representation 109 provides a twelfth representation 112. Dilation 97 of the tenth representation 110 provides a thirteenth representation 113. Conversion of negative pixels to positive pixels of the same magnitude 98 for the eleventh representation 111 gives the fifteenth representation 115. Computation of the pixel average 99 of the twelfth representation 112 provides a fourteenth representation 114. Computation of the pixel average 79 of the fifteenth representation 115 provides a seventeenth representation 117. Computation of the pixel average 78 of the original image 38 provides an eighteenth representation 118. Shifting 100 of the thirteenth representation 113 right one bit provides a sixteenth representation 116. Computation of the sum 77 of the fourteenth representation 114, seventeenth representation 117, three times the eighteenth representation 118 and subtracting 255 provides the nineteenth representation 119. Taking the maximum 75 of the sixteenth representation 116 and the value 10 provides a twentieth representation 120. Comparison 90 of the residue image 52 to the twentieth representation 120 provides a twenty-first representation 121. Conditional dilation 89 of the seventh representation 107 and twenty-first representation 121 provides the nuclei image 124.

Figure 6:
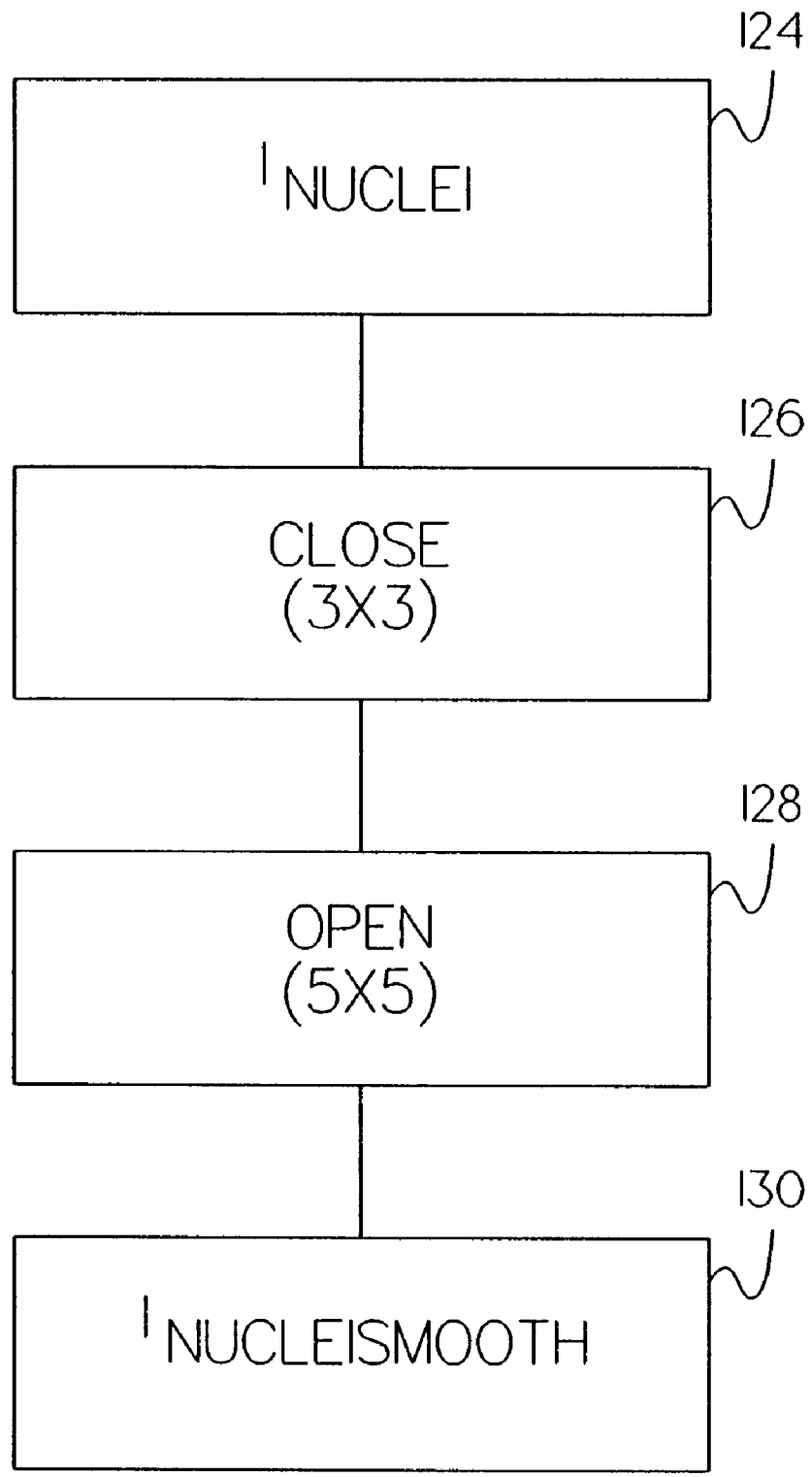
FIG. 6 shows the process flow diagram for object refinement of the invention.

Object refinement is conducted in step 34, FIG. 2B. FIG. 6 shows the object refinement step 34 in more detail. Small holes may be filled in segmentation by closing with a 3×3 structuring element 126. The segmentation mask may then be smoothed by opening with a 5×5 structuring element 128. Note that the nuclei image is updated upon completion of the smoothing operation, creating the smooth nuclei image 130.

$$I_{NucleiNoHoles}=(((I_{Nuclei}\oplus(3\times3))\ominus(3\times3))),$$

$$I_{Nuclei}=I_{NucleiSmooth}=(((I_{NucleiNoHoles}\ominus(5\times5))\oplus(5\times5)))$$

Figure 7A:
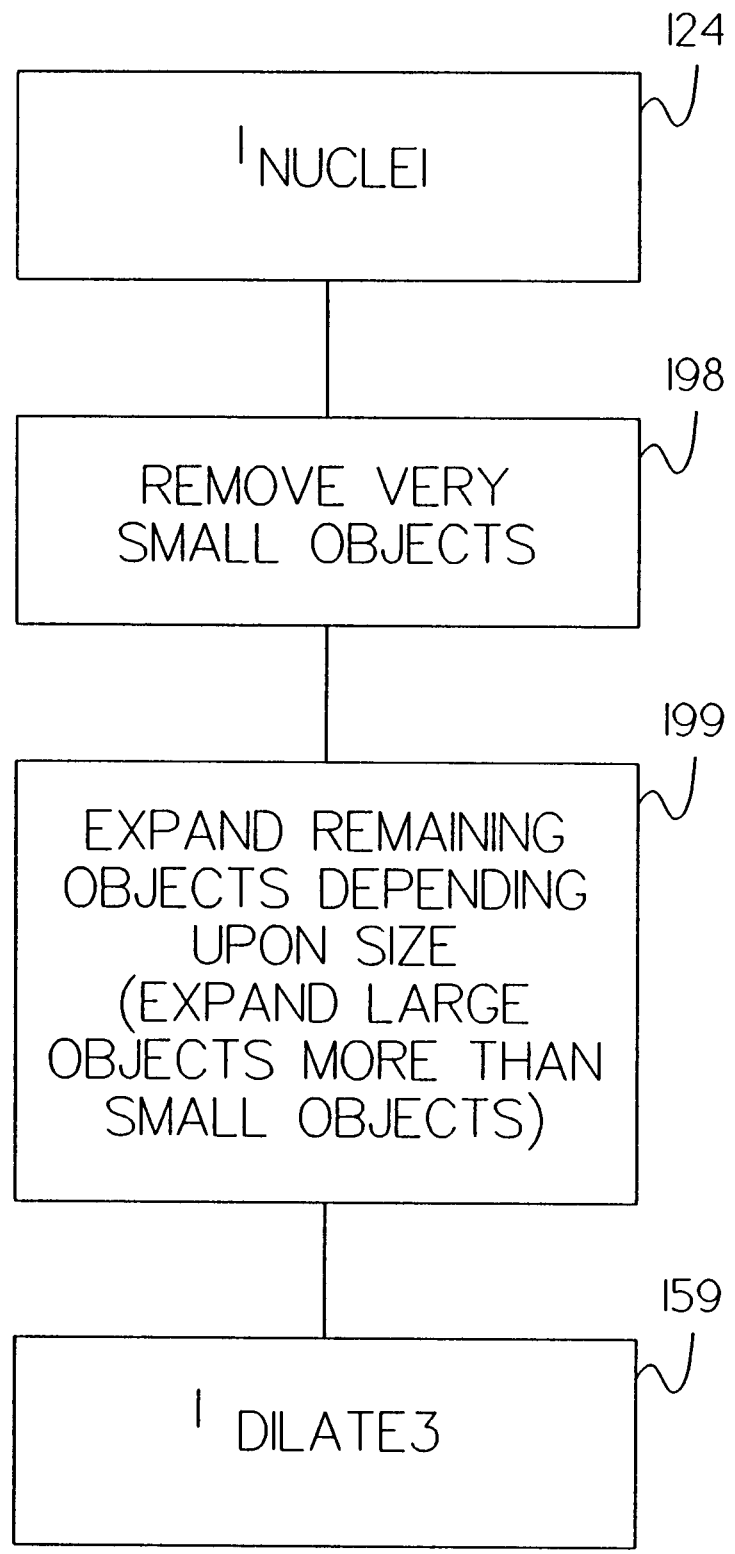
FIGS. 7A and 7B show process flow diagrams for nuclei clustering of the invention.

Now refer to FIG. 7A which shows the segmentation step for nuclei clustering. A nuclei image 124 has very small objects removed at 198. Remaining objects are expanded depending upon their size where large objects are expanded more than small objects 199. A dilated image 159 is generated.

Figure 7B:
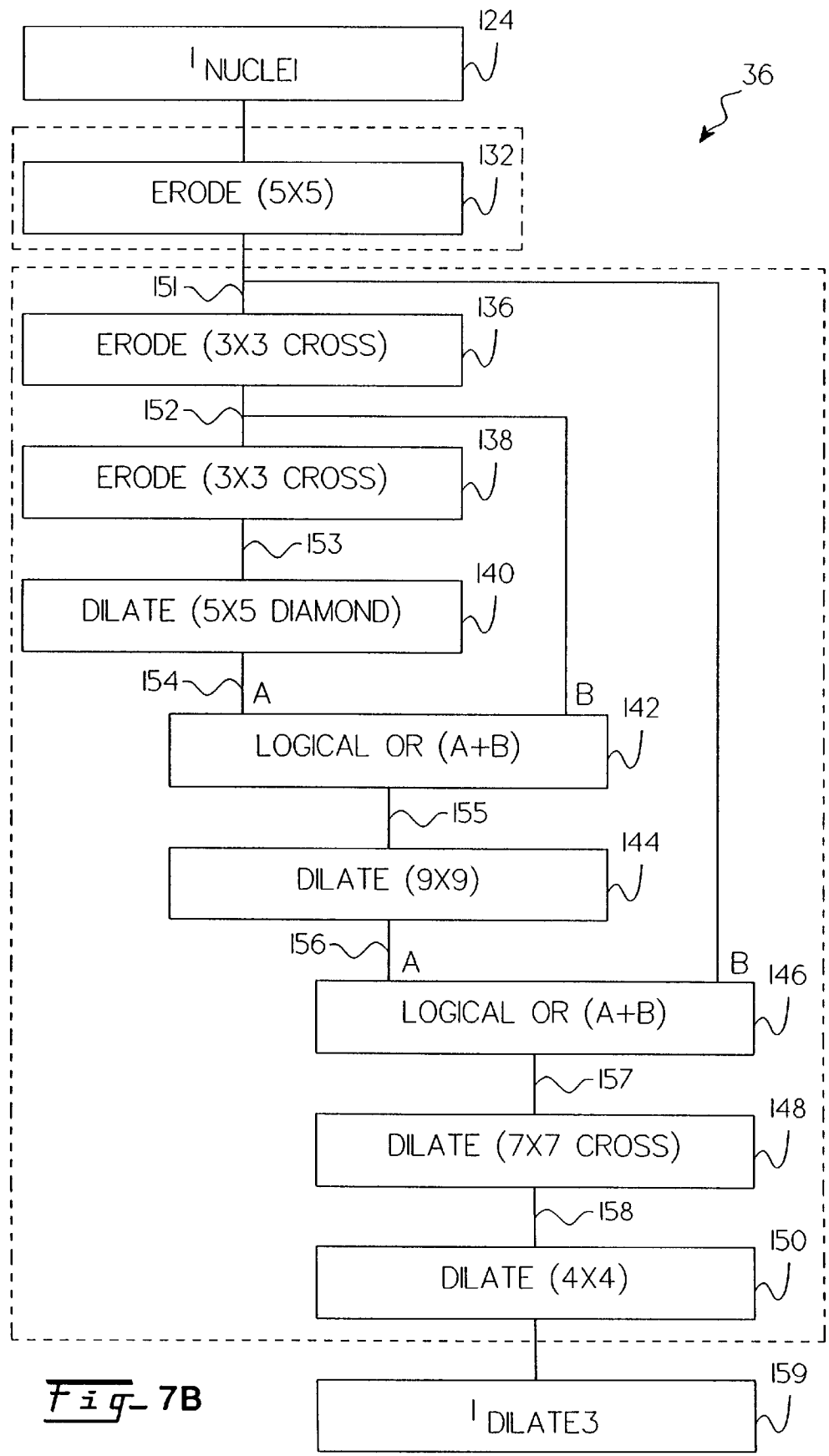

Now refer to FIG. 7B which shows processing flow for nuclei clustering. In one preferred embodiment, clustering 36 (FIG. 2B) is nuclear size dependent. Small nuclei must be close to be considered part of an aggregate, while larger nuclei are not so restricted. Larger nuclei may be more distant and still considered part of an aggregate. Clustering is accomplished by dilating nuclei dependent on size. Size dependent dilation is accomplished by creating nuclei masks for nuclei of different sizes, then dilating each according to size range and "OR"ing the masks to give a final cluster mask.

$$I_{Size1} = (I_{Nuclei} \Theta (5 \times 5))$$

$$I_{Size2} = (I_{Size1} \Theta ((3 \times 3)_{Cross}))$$

$$I_{Size3} = (I_{Size2} \Theta ((3 \times 3)_{Cross}))$$

$$I_{Dilate1} = (I_{Size3} \oplus ((5 \times 5)_{Diamond})) + I_{Size2}$$

$$I_{Dilate2} = (I_{Dilate1} \oplus (9 \times 9)) + I_{Size1}$$

$$I_{Dilate3} = (I_{Dilate2} \oplus ((7 \times 7)_{Diamond})) \oplus (4 \times 4)$$

where a 5×5 Diamond structuring element is:

$$\begin{vmatrix} 0 & 0 & 1 & 0 & 0 \\ 0 & 1 & 1 & 1 & 0 \\ 1 & 1 & 1 & 1 & 1 \\ 0 & 1 & 1 & 1 & 0 \\ 0 & 0 & 1 & 0 & 0 \end{vmatrix}$$

and a 7×7 Diamond is the 5×5 Diamond dilated by a 3×3 Cross. The invention takes the nuclei image 124 and does a 5×5 erosion 132 to provide a first cluster representation 151. A 3×3 cross erosion 136 of the first cluster representation 151 provides a second cluster representation 152. A 3×3 cross erosion 138 of the second cluster representation 152 provides a third cluster representation 153. A 5×5 diamond dilation 140 of the third cluster representation 153 provides a fourth cluster representation 154. The logical ORing 142 of the second cluster representation 152 and fourth cluster representation 154 provides a fifth cluster representation 155. Dilating 144 the fifth cluster representation provides a sixth cluster representation 156. Logical ORing 146 the first cluster representation 151 and sixth cluster representation 156 provides a seventh cluster representation 157. A 7×7 cross dilation 148 of the seventh cluster representation 157 provides an eighth cluster representation 158. A 4×4 dilation 150 of the eighth cluster representation 158 provides the segmented image 159.

In one preferred embodiment, if objects in the segmented image 159 ($I_{Dilate3}$) are larger than 2400 pixels, the object is considered to be a potential cellular aggregate. Other objects are removed from consideration.

Referring again to FIG. 2A, feature extraction 20, is the measurement of features related to the segmented potential cellular aggregates. In one embodiment, the ratio of the standard deviation of the pixel values of the nuclei to the standard deviation of the pixel values of the cluster are measured. Also, the standard deviation of the nuclear compactness is measured. Where the nuclear compactness is defined as:

NuclearCompactness=(Perimeter^2)/Area

With feature values available the object classification 22 step may be performed. In one embodiment, an object is classified as probable squamous artifact if:

(StdNuclei/StdCluster)+(StdNucCompact*0.038)>1.14.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An automated cell group recognizer for locating groups of cells on a biological specimen comprising:
    (a) an automated microscope for acquiring an image representation of a portion of the biological specimen wherein the automated microscope has an image representation output, wherein the image representation is taken at a single focus position;
    (b) an image feature extractor coupled to the automated microscope to receive the image representation output, wherein the image feature extractor has an image feature vector output;
    (c) a pixel intensity averager connected to the image representation output wherein, the pixel intensity averager has an average pixel output for pixels having an intensity greater than a first predetermined intensity;
    (d) a small dark averager connected to the image representation output having a small dark averager output;
    (e) a high pixel counter connected to the image representation to count a number of pixels greater than a second predetermined intensity wherein the high pixel counter has a count output; and
    (f) a classifier coupled to the image feature vector output, wherein the classifier has an output indicative of a likelihood that a predetermined part of the biological specimen contains a group of cells wherein the group of cells includes a cellular aggregate, and wherein the classifier also has a likelihood output.

2. The automated cell group recognizer of claim 1 further including a segmenter connected to the image representation output, the image feature vector output, and the likelihood output where the segmenter has an output that locates cell groups on the biological specimen.

3. The automated cell group recognizer of claim 2 further including an object feature extractor connected to the group location output, feature vector output and image representation having a group feature vector output.

4. The automated cell group recognizer of claim 3 further including an object classifier connected to the group feature vector output, image feature vector output wherein the object classifier has an object classification output.

5. The automated cell group recognizer of claim 2 wherein the segmenter further comprises:
    (a) a large object remover to filter objects greater than a first predetermined size from the image representation output having a first image output;
    (b) a small object remover connected to the first image output to filter objects smaller than a second predetermined size having a second image output;
    (c) an image thresholder connected to the second image output to locate a nuclei-like object having a third image output;
    (d) an object refiner to fill small holes and remove jagged edges from the third image output having a fourth image output; and
    (e) a cluster connected to the fourth image output to group nuclei that are in close proximity and eliminate those that are not in close proximity wherein the cluster has an output that locates all groups on the biological specimen.

6. The automated cell group recognizer of claim 5 where the large object remover and small object remover comprise grey scale morphological operators.

7. The automated cell group recognizer of claim 5, wherein the large object remover further comprises a field of view computer.

8. The automated cell group recognizer of claim 5 wherein the small object remover further comprises a morphological processor to perform an opening operation.

9. The automated cell group recognizer of claim 8 wherein the opening operation comprises a 9×9 flat top operation.

10. The automated cell group recognizer of claim 1 wherein the biological specimen is a pap smear.

11. The automated cell group recognizer of claim 1 wherein the biological specimen is a gynecological specimen.

12. The automated cell group recognizer of claim 1 wherein the group of cells comprise cells that overlap.

13. The automated cell group recognizer of claim 1 wherein the portion of the biological specimen comprises at least one field of view of the automated microscope.

14. The automated cell group recognizer of claim 1 wherein the first predetermined intensity is at least 200 for an 8 bit pixel.

15. The automated cell group recognizer of claim 1 wherein the small dark averager further comprises a computer processor coupled to the image representation output, where the image representation output includes an original image, and where the computer processor computes a small dark average according to the following equation:

$$SmallDarkEdgeAverage = \frac{1}{N_{Pixels}} \sum_{All_{Pixels}} (((I_{orig} \oplus (5 \times 5)) \ominus (5 \times 5)) - I_{orig})$$

where $N_{Pixels}$ is the number of pixels in an image, $All_{Pixels}$ indicates that the summation covers all pixels in the image, $I_{org}$ is the original image, and $\ominus$ is the morphological dilation operator.

16. The automated cell group recognizer of claim 1 wherein the classifier further comprises an average high pixel value comparator to compare an average high pixel value against a first predetermined intensity threshold wherein the average high pixel value comparator outputs the likelihood output.

17. The automated cell group recognizer of claim 1 wherein the classifier further comprises a small dark averager/high pixel comparator connected to the image representation output wherein the small dark averager/high pixel comparator outputs the likelihood output.

18. An automated cell group recognizer for locating groups of cells on a biological specimen comprising:
(a) an automated microscope for acquiring an image representation of a portion of the biological specimen wherein the automated microscope has an image representation output, wherein the image representation is taken at a single focus position;
(b) an image feature extractor coupled to the automated microscope to receive the image representation, wherein the image feature extractor has an image feature vector output;
(c) a classifier coupled to the image feature vector output, wherein the classifier has an output indicative of a likelihood that a predetermined part of the biological specimen contains a group of cells wherein the group of cells includes a cellular aggregate, and wherein the classifier also has a likelihood output; and
(d) a computer processor coupled to the image representation output, where the image representation output includes an original image, and where the computer processor computes a small dark average according to the following equation: where $N_{Pixels}$ is the number of pixels in an image, $All_{Pixels}$ indicates that the $$SmallDarkEdgeAverage = \frac{1}{N_{Pixels}} \sum_{All_{Pixels}} (((I_{orig} \oplus (5 \times 5)) \ominus (5 \times 5)) - I_{orig})$$

summation covers all pixels in the image, $I_{org}$ is the original image, and $\oplus$ is the morphological dilation operator.

19. An automated cell group recognizer for locating groups of cells on a biological specimen comprising:
(a) an automated microscope for acquiring an image representation of a portion of the biological specimen wherein the automated microscope has an image representation output wherein the image representation is taken at a single focus position;
(b) an image feature extractor coupled to the automated microscope to receive the image representation, wherein the image feature extractor has an image feature vector output;
(c) a classifier coupled to the image feature vector output wherein the classifier has an output indicative of a likelihood that a predetermined part of the biological specimen contains a group of cells wherein the group of cells includes a cellular aggregate, and wherein the classifier also has a likelihood output; and
(d) a small dark averager/high pixel comparator connected to the image representation output, where the image representation output includes an original image, wherein the small dark averager/high pixel comparator further comprises a processor where image representation output is used to compute a small dark average by the following equation:

$$SmallDarkEdgeAverage = \frac{1}{N_{Pixels}} \sum_{All_{Pixels}} (((I_{orig} \oplus (5 \times 5)) \ominus (5 \times 5)) - I_{orig})$$

where $N_{Pixels}$ is the number of pixels in an image, $All_{Pixels}$ indicates that the summation covers all pixels in the image, $I_{org}$ is the original image, and $\oplus$ is the morphological dilation operator.

20. A method for automated cell group recognition for locating groups of cells on a biological specimen comprising the steps of:
(a) acquiring an image representation of a portion of the biological specimen, wherein the image representation is taken at a single focus position;
(b) image feature extracting an image feature vector from the image representation;
(c) pixel intensity averaging the image representation to generate an average pixel output for pixels having an intensity greater than a first predetermined intensity;
(d) small dark averaging the image representation to generate a small dark average output;
(e) high pixel counting the image representation to count a number of pixels greater than a second predetermined intensity; and
(f) classifying the image feature vector to generate a likelihood that a predetermined part of the biological specimen contains a group of cells wherein the group of cells includes a cellular aggregate.

21. The method of claim 20 further comprising the step of locating cell groups of the biological specimen based on the image representation, the image feature vector and the likelihood that a predetermined part of the biological specimen contains a group of cells.

22. An image segmenting apparatus for segmenting an image, wherein the image is taken at a single focus position, the image segmenting apparatus comprising:

(a) a large object remover to filter objects greater than a first predetermined size from the image having a first image output;

(b) a small object remover connected to the first image output to filter objects small than a second predetermined size having a second image output;

(c) an image thresholder connected to the second image output to locate a nuclei-like object having third image output;

(d) an object refiner to fill small holes and remove jagged edges from the third image output having a fourth image output; and (e) a clusterer connected to the fourth image output for grouping nuclei that are in a cellular aggregate and for eliminating nuclei that are not in the cellular aggregate.

* * * * *